United States Patent
Zhao (10) Patent No.: US 9,649,931 B2
(45) Date of Patent: May 16, 2017

(54) VEHICLE DIFFERENTIAL ASSEMBLY

(71) Applicant: GM GLOBAL TECHNOLOGY OPERATIONS LLC, Detroit, MI (US)

(72) Inventor: Shaun X. Zhao, Novi, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 0 days.

(21) Appl. No.: 14/735,364

(22) Filed: Jun. 10, 2015

(65) Prior Publication Data

US 2016/0361998 A1    Dec. 15, 2016

(51) Int. Cl.

| F16H 48/20 | (2012.01) |
|---|---|
| B60K 17/346 | (2006.01) |
| F16H 48/08 | (2006.01) |
| B60K 17/354 | (2006.01) |
| F16H 48/24 | (2006.01) |
| F16H 48/38 | (2012.01) |
| F16H 48/30 | (2012.01) |

(52) U.S. Cl.
CPC ........ *B60K 17/3462* (2013.01); *B60K 17/354* (2013.01); *F16H 48/08* (2013.01); *F16H 48/20* (2013.01); *F16H 48/24* (2013.01); *F16H 48/30* (2013.01); *F16H 2048/385* (2013.01)

(58) Field of Classification Search
None
See application file for complete search history.

(56) References Cited

U.S. PATENT DOCUMENTS

| 1,726,246 | A | * | 8/1929 | Stevens | F16H 37/04 475/218 |
|---|---|---|---|---|---|
| 2,666,337 | A | * | 1/1954 | Brownyer | F16H 3/64 475/138 |
| 3,505,902 | A | * | 4/1970 | Myers | F16D 41/00 74/650 |
| 4,669,332 | A | * | 6/1987 | Katayama | B60K 17/344 475/206 |
| 6,398,686 | B1 | * | 6/2002 | Irwin | F16H 48/22 192/84.6 |
| 6,432,021 | B1 | * | 8/2002 | Averill | B60K 17/35 475/237 |
| 7,722,495 | B1 | * | 5/2010 | Stanley | F16H 1/14 475/220 |
| 2004/0026204 | A1 | * | 2/2004 | Shimura | F16D 23/06 192/53.3 |
| 2010/0267508 | A1 | * | 10/2010 | Hvolka | F16H 3/54 475/149 |
| 2011/0256976 | A1 | * | 10/2011 | Burgbacher | B60K 17/35 475/198 |

(Continued)

*Primary Examiner* — Justin Holmes
(74) *Attorney, Agent, or Firm* — Cantor Colburn LLP (57) ABSTRACT

A vehicle differential assembly is provided. The differential assembly including a differential case rotationally coupled to a differential housing. A differential gear set is rotationally coupled to the differential case. A ring gear rotationally coupled to the differential case. A disconnect member operably coupled between the ring gear and the differential case. The disconnect member having a torque transmitting member movable between a coupled and an uncoupled position, wherein the ring gear is rotationally coupled to the differential case when the torque transmitting member is in the coupled position.

12 Claims, 5 Drawing Sheets

(56) References Cited

U.S. PATENT DOCUMENTS

| | | | |
|---|---|---|---|
| 2012/0053002 A1* | 3/2012 | Schmidt | F16D 28/00 |
| | | | 475/231 |
| 2012/0196716 A1* | 8/2012 | Rosemeier | B60K 17/165 |
| | | | 475/205 |
| 2013/0303324 A1* | 11/2013 | Valente | F16H 37/082 |
| | | | 475/204 |
| 2014/0021005 A1* | 1/2014 | Greiss | F16J 15/002 |
| | | | 192/112 |

* cited by examiner

VEHICLE DIFFERENTIAL ASSEMBLY

FIELD OF THE INVENTION

The subject invention relates to a vehicle differential assembly, and more particularly, to a differential assembly configured to selectively disconnect from a power source.

BACKGROUND

Vehicles, such as automobiles and trucks for example, include a differential and axle assembly, sometime colloquially referred to as a drive module. This assembly is connected to the vehicle engine by a prop-shaft. The prop-shaft transmits rotational energy (torque) developed by the vehicle engine to the differential and axle assembly, which in turn transmits the rotational energy to the wheels. In a rear-wheel drive vehicle, the prop-shaft directly couples the differential and axle assembly to the vehicle's transmission. In an all-wheel or four-wheel drive vehicle, additional components may also be included, such as a power take-off unit for example.

In an all-wheel drive type vehicle where torque is transmitted to both the front and rear wheels, it is sometimes desirable to disconnect one set of wheels from the engine to improve fuel efficiency and vehicle performance. Typically, a disconnect member is coupled to the front differential assembly in a manner that separates at least one of the wheel axles from the differential and axle assembly. While this is effective in removing torque from the wheels, the differential gearing within the differential assembly continues to rotate. This rotation of the differential gearing when the disconnect member is actuated results in gear churning losses and undesired wear on the components.

Accordingly, it is desirable to provide a differential and axle assembly having a disconnect that reduces losses and improves efficiency.

SUMMARY OF THE INVENTION

In one exemplary embodiment of the invention, a vehicle differential assembly is provided. The differential assembly includes a differential housing and a differential case rotationally coupled to the differential housing. A differential gear set is rotationally coupled to the differential case. A ring gear is rotationally coupled to the differential case. A disconnect member is operably coupled between the ring gear the differential case, the disconnect member having a torque transmitting member movable between a coupled and an uncoupled position, wherein the ring gear is rotationally coupled to the differential case when the torque transmitting member is in the coupled position.

In another exemplary embodiment of the invention, a method of selectively transmitting torque with a vehicle differential assembly is provided. The method comprising providing a differential housing. A differential case is rotationally coupled to the differential housing. A differential gear set is rotationally coupled to the differential case. A ring gear is rotationally coupled to the differential case. A disconnect member is moved between a coupled position and an uncoupled position, the disconnect member being disposed between the ring gear and the differential case. Torque is transmitted from the ring gear to the differential case when in the coupled position. The transmission of torque from the ring gear to the differential case is stopped when in the uncoupled position.

In another exemplary embodiment of the invention, a vehicle is provided. The vehicle having an engine configured to transmit torque. A differential housing having a pinion is provided, the pinion being operably coupled to receive torque from the engine. A differential case is rotationally coupled to the differential housing. A differential gear set is rotationally coupled to the differential case. A ring gear is disposed within the differential housing and rotationally coupled to the differential case, the ring gear being operably coupled to the pinion. A disconnect member is operably coupled between the ring gear and the differential case. The disconnect member having a torque transmitting member movable between a coupled and an uncoupled position, wherein the ring gear is rotationally coupled to the differential case when the torque transmitting member is in the coupled position. At least one axle is coupled to receive torque from the differential gear set when the disconnect member is in the coupled position.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

Figure 1:
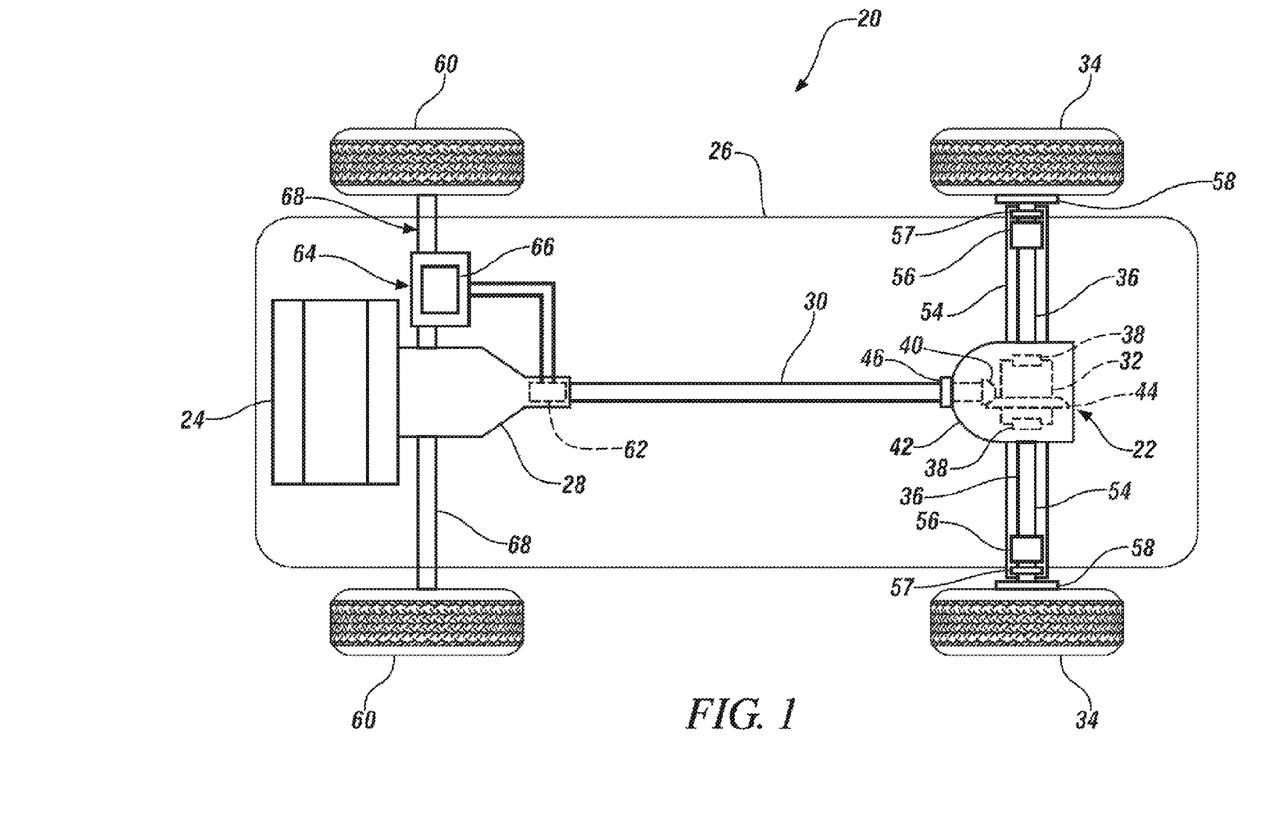
FIG. 1 is a top schematic view of a vehicle having a differential housing and axle assembly in accordance with an embodiment of the invention.

In accordance with an embodiment of the invention, FIG. 1 illustrates a vehicle 20 having a differential assembly 22. The differential assembly 22 may sometimes be referred to as a rear drive module. It should be appreciated that the vehicle 20 may be an automobile, truck, van or sport utility vehicle for example. As used herein, the term vehicle is not limited to just an automobile, truck, van or sport utility vehicle, but may also include any self-propelled or towed conveyance suitable for transporting a burden. The vehicle 20 may include an engine 24, such as a gasoline or diesel fueled internal combustion engine for example. The engine 24 may further be a hybrid type engine that combines an internal combustion engine with an electric motor for example. The engine 24 and differential assembly 22 are coupled to a frame or other chassis structure 26. The engine 24 is coupled to the rear differential assembly 22 by a transmission 28 and a driveshaft 30. The transmission 28 may be configured to reduce the rotational velocity and increase the torque of the engine output. This modified output is then transmitted to the differential assembly 22 via the driveshaft 30. The rear differential assembly 22 transmits the output torque from the driveshaft 30 through a differential gear set 32 to a pair of driven-wheels 34 via axles 36.

The differential gear set 32 is arranged within a differential housing 42. The differential gear set 32 receives the output from the driveshaft 30 via a pinion 40 that transmits the torque to a ring gear 44. The pinion 40 includes a shaft that is coupled to the driveshaft 30 by a flange 46. The differential gear set 32 is supported for rotation within the housing 42 by a pair of differential bearings. The differential gear set 32 includes side gears 38 arranged within the housing 42 that are coupled to and support one end of the axles 36. The coupling of rotational components, such as the flange 46 to the pinion 40 or the side gears 38 to the axles 36 for example, may be accomplished using a spline connection.

In one embodiment, each axle 36 extends into an axle tube 54. The axle tube 54 includes a hollow interior that extends the length thereof. At one end of the axle tube 54 a bearing 56 is mounted to support the end of the axle 36 adjacent the driven-wheel 34. A shaft seal 57 is located between the bearing 56 and the driven-wheel 34. A wheel mounting flange 58 is coupled to the end of the axle 36 adjacent the bearing 56. The flange 58 provides an interface for mounting of the driven-wheel 34.

The vehicle 24 further includes a second set of wheels 60 arranged adjacent the engine 24. In one embodiment, the second set of wheels 60 is also configured to receive output from the engine 24. This is sometimes referred to as a four-wheel or an all-wheel drive configuration. In this embodiment, the vehicle 20 may include a transfer case 62 that divides the output from the transmission 28 between the front and rear driven wheels 34, 60. The transfer case 62 transmits a portion of the output to a front differential assembly 64, which may include additional components such as a differential gear set 66 and axles 68 that transmit the output to the wheels 60.

As will be discussed in more detail below, the front differential assembly 64 may include a disconnect arrangement that allows for selective application of torque from the engine 24 to the wheels 60. It should be appreciated that while embodiments herein may describe the disconnect arrangement with reference to the front differential assembly 64, the claimed invention should not be so limited. In other embodiments, the disconnect arrangement may be incorporated into the rear differential assembly 22.

Figure 2:
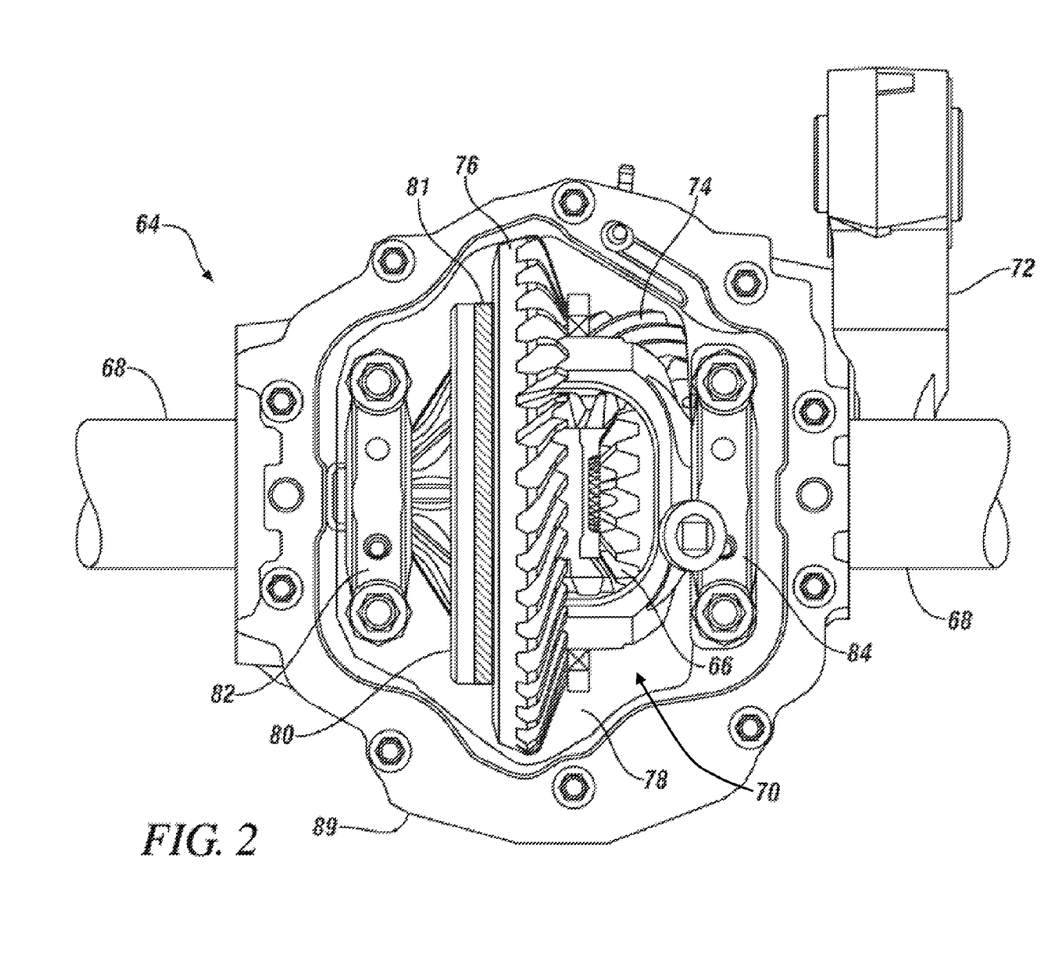
FIG. 2 is a rear view of a differential assembly with a rear cover removed in accordance with an embodiment of the invention.

Referring now to FIG. 2, an exemplary front differential assembly 64 is illustrated. The differential assembly 64 includes a housing 70 that is mounted to the vehicle frame or chassis structure in one or more locations such as by the mounting arm 72 for example. A pinion 74 that is coupled to the vehicle power source, such as engine 23 via transfer case 62 for example, extends through the housing 70. The pinion 74 includes a gear on one end that engages a ring gear 76. Also disposed within the housing 70 is a differential case 80 containing the differential gear set 66.

The differential case 80 is mounted for rotation to the housing 70 by bearings 82, 84. The ring gear 76 is mounted for rotation to a differential case 80 by at least one bearing 76. In one embodiment, the bearings 82, 84 further support the axles 68 that are coupled to the side gears of the differential gear set 66 as is known in the art.

The ring gear 76 is coupled to the differential case 80 by a disconnect member 81. The disconnect member 81 includes a torque transmitting member that is configured to selectively couple and uncouple the ring gear 76 from the differential case 80. It should be appreciated that when the ring gear 76 is coupled to the differential case 80, the differential case 80 will be rotated by the ring gear 76 when torque is applied via the pinion 74. In turn, the differential gear set 66 rotates the axles 68 to provide torque to the front wheels 60. When the disconnect member 81 is in the uncoupled position, the ring gear 76 is separated from the differential case 80 and substantially no torque is transmitted to the differential case 80 and the wheels 60 are free to rotate. When in the disconnect member 81 is in the uncoupled state, the ring gear 76 may continue to rotate due to torque from the pinion 74.

It should be appreciated that when the disconnect member 81 is in the uncoupled position, this provides advantages in that the gears 66 do not rotate and churning losses are substantially avoided. The change between the coupled and uncoupled states by the disconnect member 81 may be in response to a manual operator action (e.g. changing to four-wheel mode) or may be performed automatically by the vehicle control system in response to predetermined operating conditions for example.

Figure 3:
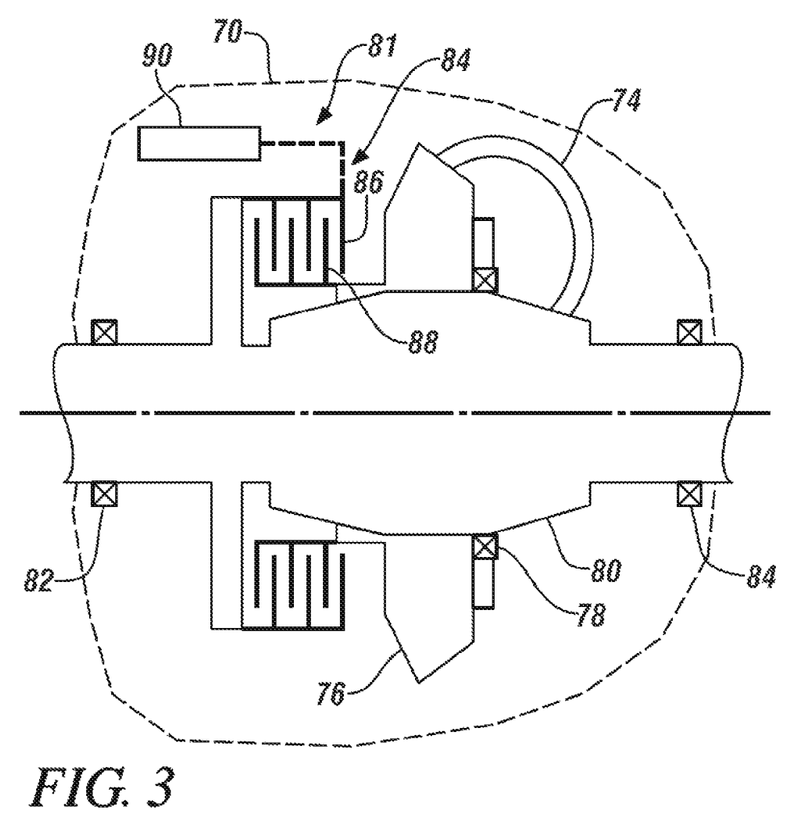
FIG. 3 is a schematic illustration of a portion of the differential assembly in accordance with an embodiment of the invention.

Referring now to FIG. 3, an embodiment of a disconnect member 81 is shown having a friction clutch 84. In this embodiment, the friction clutch 84 includes at least one first member, such as pressure plate 86, that is coupled to the differential case 80 and at least one second member, such as clutch plate 88, which is coupled to the ring gear 76. In one embodiment, the first and second members may each be comprised of a plurality of plates. The plates 86, 88 may be made from a suitable material, such as a compound organic resin or a ceramic material for example, that prevents or allows only limited slippage between the plates 86, 88 when the plates are in contact with each other. It should be appreciated at the friction clutch 84 may include other components, such as a throw-out bearing for example.

The friction clutch 84 further includes an actuator 90. The actuator 90 is a suitable device, such as a electromechanical solenoid, a hydraulic motor or an electrical motor for example, that is coupled to the pressure plate 86 and configured to move the pressure plate 86 between a coupled and an uncoupled position. It should be appreciated that while embodiments herein describe the actuator 90 as being coupled to the plate 86, the claimed invention should not be so limited and in other embodiments, the actuator 90 is coupled to plate 88.

During operation, the differential assembly may be selectively configured to transmit or not transmit torque. To provide torque to the front wheels 60, the actuator 90 moves the plate 86 from the uncoupled position into a coupled position where the plate 86 is pressed against the plate 88 such that there is little or no slippage between the plates 86, 88 due to frictional forces. The plate 88 rotates with the plate 86 to apply torque to the differential case 80 and thus the wheels 60. When torque to the front wheels 60 is no longer desired, the actuator 90 moves the plate 86 away from the plate 88 to separate the plates 86, 88 and uncouple the differential case 80 from the ring gear 76.

Figure 4:
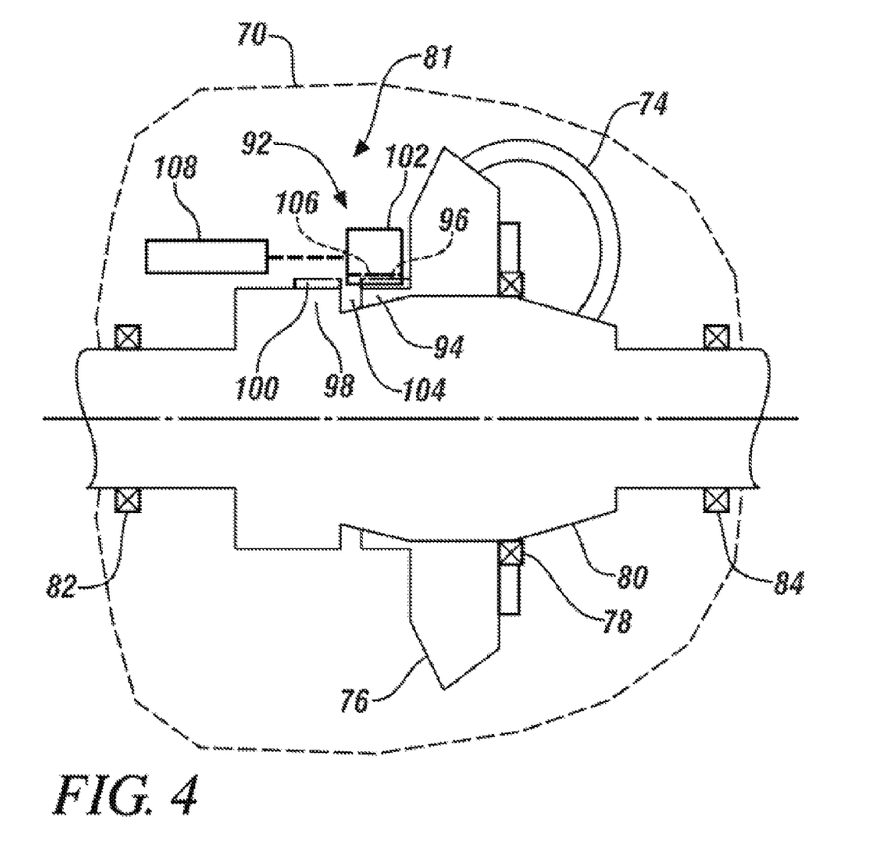
FIG. 4 is a schematic illustration of a portion of the differential assembly with the differential case and ring gear in an unlocked position in accordance with another embodiment of the invention.

Referring now to FIG. 4, another disconnect member 80 is shown having a splined connection 92. In this embodiment, the ring gear 76 includes cylindrical portion 94 having a spline 96. Similarly, the differential case 80 includes a cylindrical portion 98 having a spline 100. A spline is a projection or keyway member that extends out of the cylindrical portions 94, 98 and are arranged to engage a corresponding slot in an adjacent member. When the spline is engaged in a slot, the two members are rotationally coupled. In one embodiment, the spline 96 and spline 100 have the same shape. The splines 96, 100 may have any suitable shape and a plurality of splines may be disposed about the circumference of the cylindrical portions 94, 98.

Figure 5:
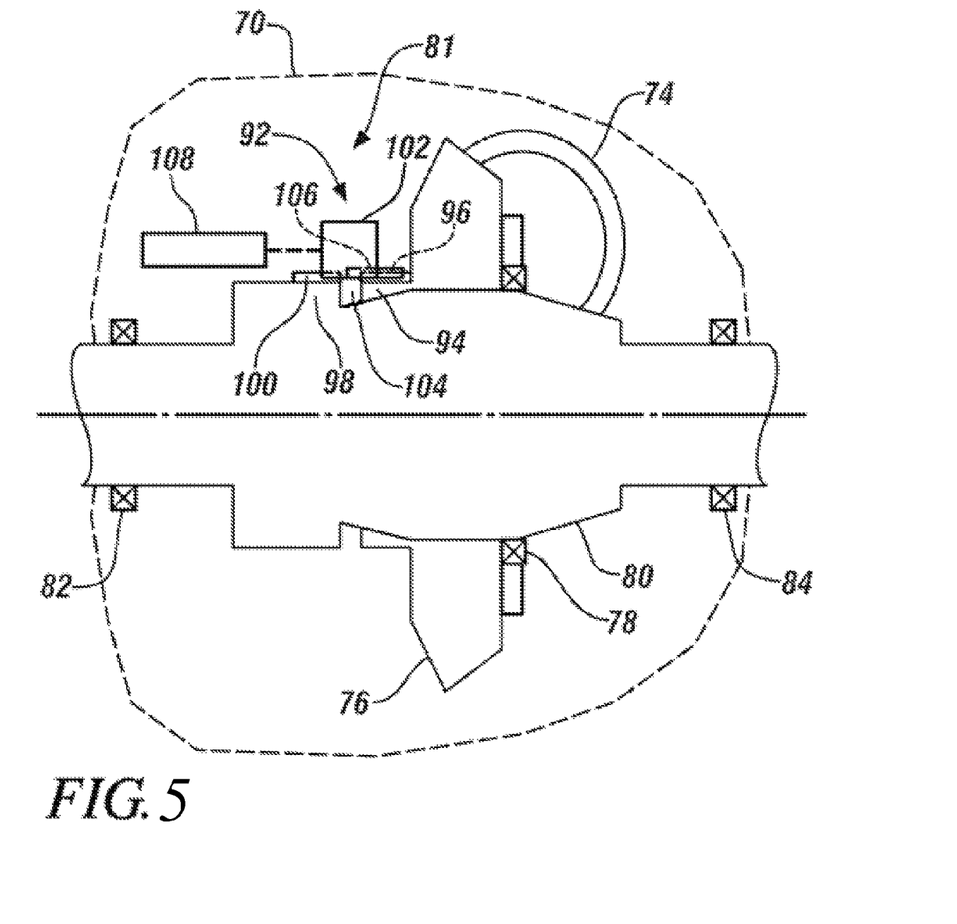
FIG. 5 is a schematic illustration of the portion of the differential assembly of FIG. 4 with the differential case and ring gear in a locked position.

The splined connection 92 further includes a lock ring 102. The lock ring 102 is an annular member that extends about the periphery of the cylindrical portions 94, 98. The lock ring 102 is movable between an uncoupled position (FIG. 4) and a coupled position (FIG. 5) where the lock ring 102 is positioned to span across a gap 104 between the differential case 80 and the ring gear 76. When in the coupled position, the differential case 80 and ring gear 76 are rotationally coupled. The lock ring 102 includes a spline 106 that is sized and shaped to correspond to the splines 96, 100. It should be appreciated that while the embodiment of FIGS. 4 and 5 illustrate the splines 96, 100 as being a male keyway and the spline 106 as being a female keyway, the claimed invention should not be so limited and in other embodiments this configuration may be reversed.

The spline connection 92 further includes an actuator 108 that is coupled to the lock ring 102. The actuator 108 is configured to move the lock ring 102 from the uncoupled position (illustrated in FIG. 4 in solid line) to a coupled position (illustrated in FIG. 4 in dashed line). It should be appreciated that while the lock ring 102 is illustrated as being positioned on the ring gear 76 when in the uncoupled position, the claimed invention should not be so limited. In other embodiments, the lock ring 102 may be positioned on the differential case 80 in the uncoupled position.

In operation, to apply torque to the front wheels 60 the actuator 108 is activated and the lock ring 102 is moved from the uncoupled to the coupled position. When moved into the coupled position, the spline 106 of lock ring 102 is engaged to the spline 96 of ring gear 76 and the spline 100 of differential case 80. As such, the differential case 80 and ring gear 76 become rotationally locked by the lock ring 102 with the torque being transferred by the respective splines 96, 100, 106. When torque to the front wheels 60 is no longer desired, the actuator 108 moves the lock ring 102 from the coupled to the uncoupled position to rotationally disconnect the differential case 80 from the ring gear 76.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle differential assembly comprising:
    a differential housing;
    a differential case rotationally coupled to and disposed within the differential housing, the differential case having a first spline portion;
    a differential gear set rotationally coupled to and disposed within the differential case;
    a ring gear rotationally coupled to and disposed about the differential case, the ring gear having a second spline portion; and
    a disconnect member operably coupled between the ring gear and the differential case, the disconnect member having a torque transmitting member movable between a coupled and an uncoupled position, the disconnected member being in the coupled position when the torque transmitting member is coupled to the first spline portion and the second spline portion, wherein the ring gear is rotationally coupled to the differential case when the torque transmitting member is in the coupled position.

2. The vehicle differential assembly of claim 1 wherein the disconnect member further includes an actuator operably coupled to move the torque transmitting member between the coupled position and uncoupled position.

3. The vehicle differential assembly of claim 1 wherein the torque transmitting member includes an annular lock ring operably coupled to the ring gear and the differential case, the lock ring being movable between the coupled position and the uncoupled position, the lock ring being configured to transmit torque between the ring gear and the differential case when in the coupled position.

4. The vehicle differential assembly of claim 3 wherein:
    the ring gear includes a first spline portion;
    the differential case having a second spline portion; and
    the lock ring includes a third spline portion sized and shaped to couple with the first spline portion and second spline portion when in the coupled position; and
    the annular lock ring is disposed about the differential case and a portion of the ring gear.

5. A method of selectively transmitting torque with a vehicle differential assembly, the method comprising:
    providing a differential housing;
    rotationally coupling a differential case to the differential housing, the differential case having a first spline portion, the differential case being disposed within the differential housing;
    rotationally coupling a differential gear set to the differential case, the differential gear set being disposed within the differential case;
    rotationally coupling a ring gear to the differential case, the ring gear being disposed about the differential case and having a second spline portion;
    moving a disconnect member between a coupled position and an uncoupled position, the disconnect member being coupled to the first spline portion and second spline portion when in the coupled position;
    transmitting torque from the ring gear to the differential case when in the coupled position; and
    rotating the ring gear independently from the differential case to stop the transmission of torque from the ring gear to the differential case when in the uncoupled position.

6. The method of claim 5 further comprising activating an actuator to move the disconnect member between the coupled position and the uncoupled position.

7. The method of claim 6 wherein the step of moving the disconnect member includes moving a lock ring, the lock ring being coupled to one of the first spline portion and second spline portion when in the uncoupled position and coupled to both the first spline portion and second spline portion when in the coupled position.

8. The method of claim 7 wherein the step of moving the lock ring includes engaging one of the first spline and second spline with a third spline on the lock ring prior to transmitting torque from the ring gear to the differential case.

9. A vehicle comprising:
   an engine configured to transmit torque;
   a differential housing having a pinion, the pinion being operably coupled to receive torque from the engine;
   a differential case rotationally coupled to and disposed within the differential housing, the differential case having a first spline portion;
   a differential gear set rotationally coupled to the differential case, the differential gear set being disposed within the differential case;
   a ring gear disposed within the differential housing and rotationally coupled to and disposed about the differential case, the ring gear having a second spline portion, the ring gear being operably coupled to the pinion;
   an annular disconnect member operably coupled between the ring gear and the differential case, the disconnect member being disposed about at least a portion of the differential case and at least a portion of the ring gear, the disconnect member having a torque transmitting member movable between a coupled and an uncoupled position, the disconnected member being in the coupled position when the torque transmitting member is coupled to the first spline portion and the second spline portion, wherein the ring gear is rotationally coupled to the differential case when the torque transmitting member is in the coupled position; and
   at least one axle coupled to receive torque from the differential gear set when the disconnect member is in the coupled position.

10. The vehicle of claim 9 wherein the disconnect member further includes an actuator operably coupled to move the torque transmitting member between the coupled position and uncoupled position.

11. The vehicle of claim 9 wherein the torque transmitting member includes an annular lock ring operably coupled to the first spline portion and the second spline portion, the lock ring being movable between the coupled position and the uncoupled position, the lock ring being configured to transmit torque between the ring gear and the differential case when in the coupled position.

12. The vehicle of claim 11 wherein:
   the ring gear includes a first spline portion;
   the differential case having a second spline portion; and
   the lock ring having a third spline portion sized and shaped to couple with the first spline portion and second spline portion.

* * * * *